United States Patent [19]

Thordarsson

[11] 4,051,729

[45] Oct. 4, 1977

[54] AMPLIFIER BEAM TYPE TRANSDUCER

[75] Inventor: Petur Thordarsson, Seattle, Wash.

[73] Assignee: Thordarson, Inc., Seattle, Wash.

[21] Appl. No.: 702,280

[22] Filed: July 2, 1976

[51] Int. Cl.² ........................................... G01L 13/00
[52] U.S. Cl. ............................................... 73/407 R
[58] Field of Search ................. 73/182, 405, 407 R, 73/407 PR, 141 R; 74/519, 522; 177/DIG. 9; 235/200 WB

[56] References Cited

U.S. PATENT DOCUMENTS

| 2,631,599 | 3/1953 | Markson | 73/407 R X |
| 2,669,129 | 2/1954 | Williams | 73/407 R X |
| 3,185,168 | 5/1965 | Phillips | 73/407 R |

*Primary Examiner*—Charles A. Ruehl
*Attorney, Agent, or Firm*—Graybeal, Barnard & Uhlir

[57] ABSTRACT

The beam of an amplifier beam transducer is maintained on a support edge of a fulcrum for pivotal movement thereabout yet restrained against other movement by a U-shaped yoke which cooperates with means disposed near opposite ends of the beam forming a pair of parallel axes about which the beam pivots. A fulcrum adjusting screw positions the support edge of a fulcrum lengthwise in the beam chamber varying the beam lengths on opposite sides of the support edge. A single load input cell or pair of differentially acting load input cells are threadably received in an opening on the housing and exert a force on one end of the beam tending to pivot the beam about the support edge of the fulcrum. An output cell, also threadably received in an opening on the housing, contacts the opposite end of the beam and produces an output signal in response to deviations of the input end of the beam. In one embodiment, the load output cell comprises a control orifice in which the orifice size is varied by deflection of the beam causing a corresponding variation in a fluid stream. One side wall of the housing is removable allowing access to the beam chamber for installation and removal of the internal component parts. An indicator is provided on a side wall of the housing which shows the lengths of the beam portions on opposite sides of the fulcrum support edge.

23 Claims, 9 Drawing Figures

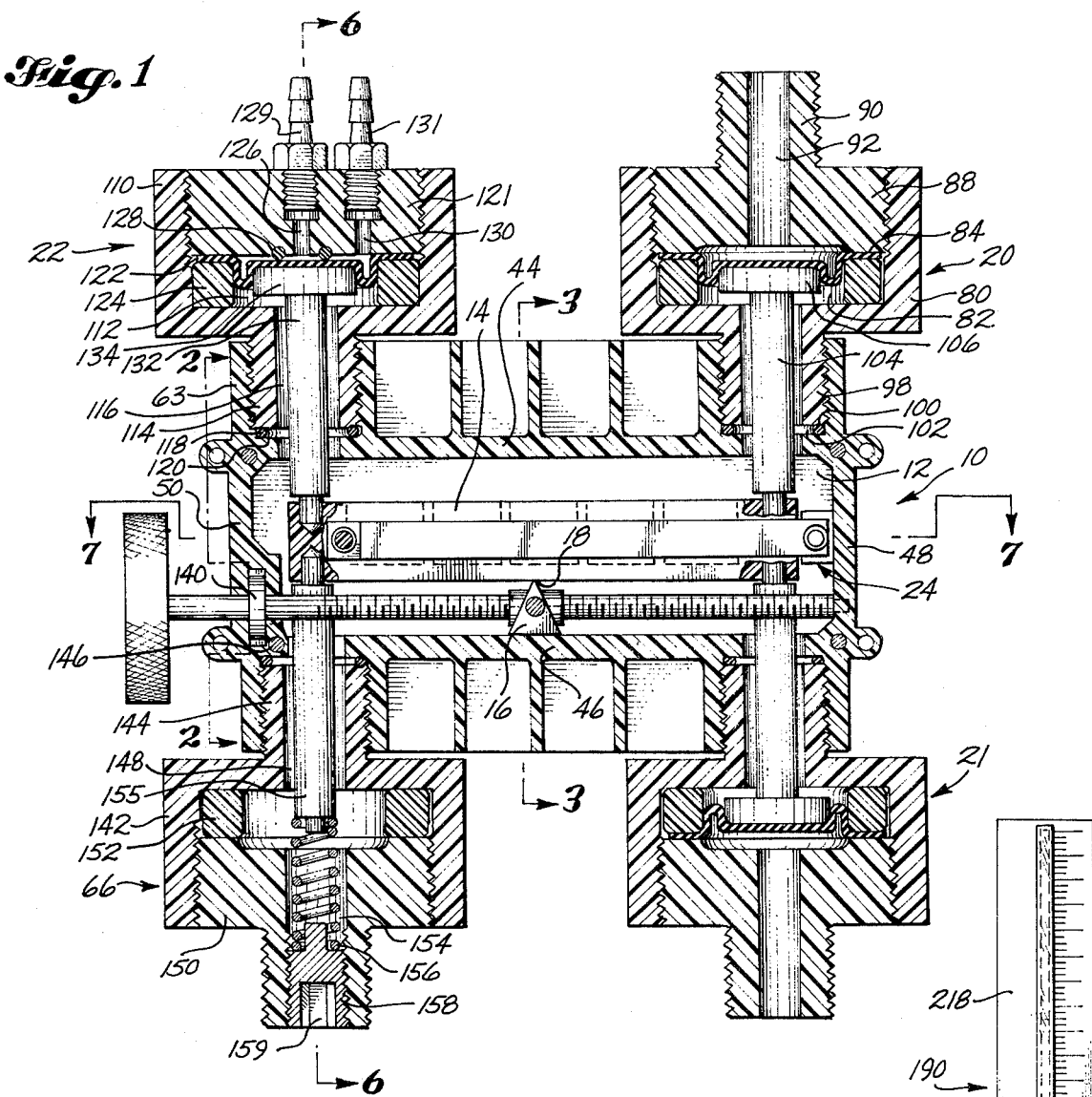
Fig. 1
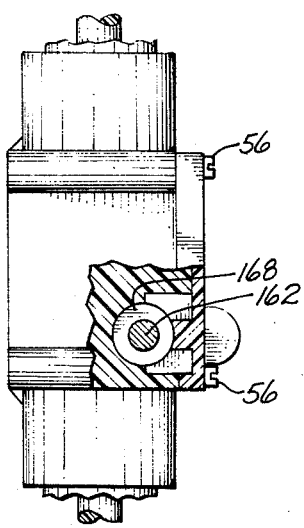
Fig. 2
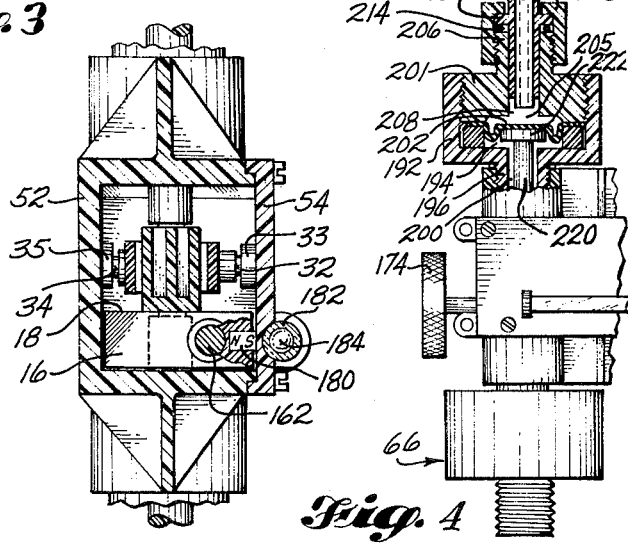
Fig. 3
Fig. 4

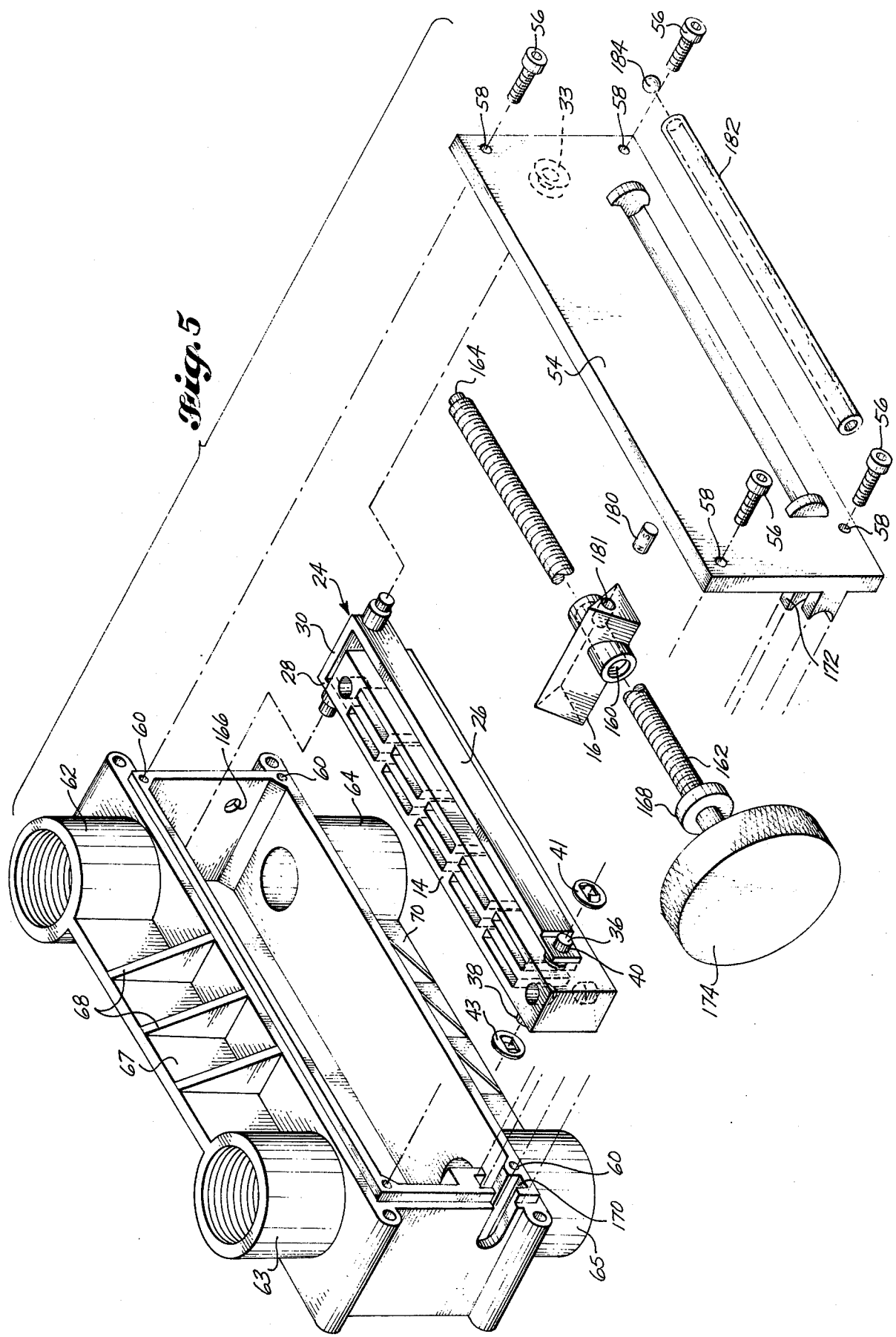

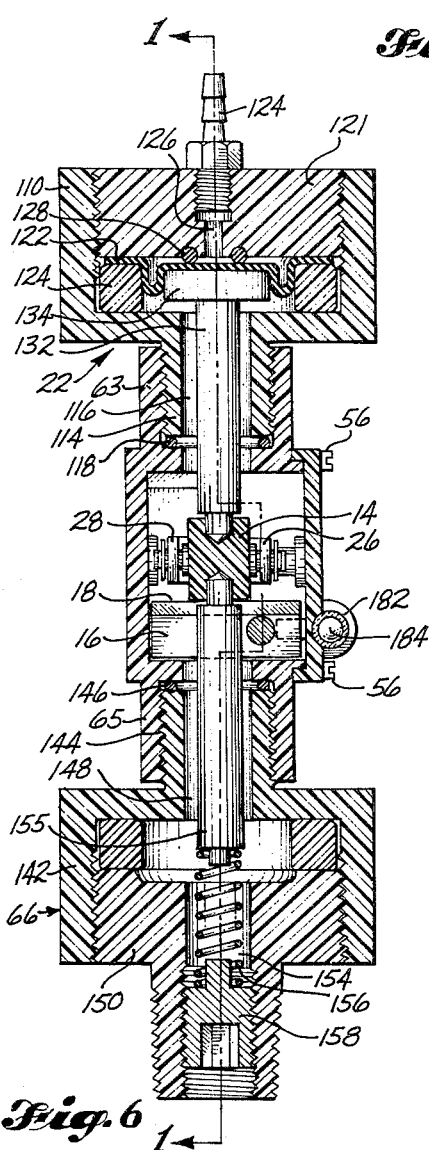
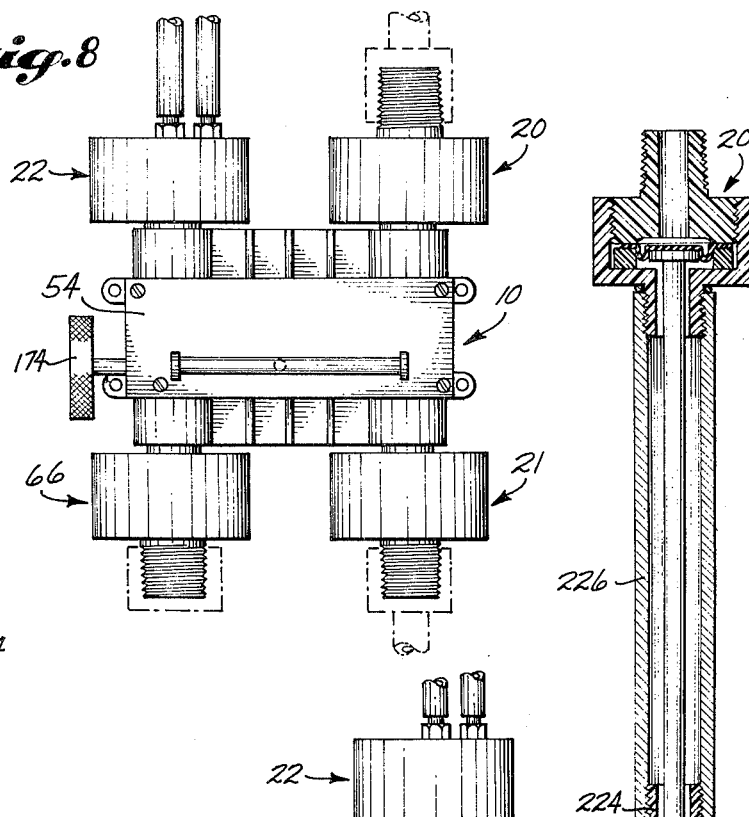
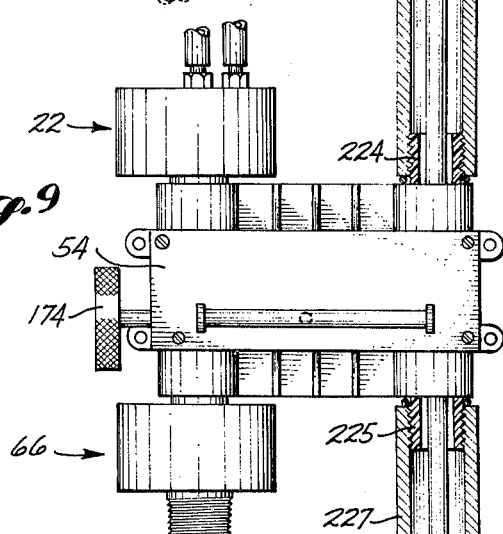
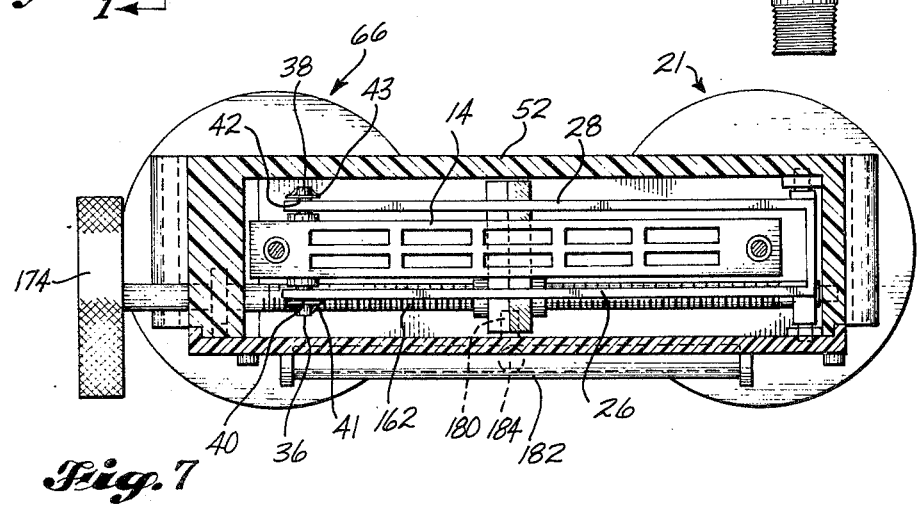
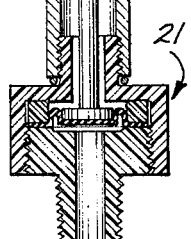

AMPLIFIER BEAM TYPE TRANSDUCER

BACKGROUND OF THE INVENTION

1. Field of the Invention

This invention relates to amplifier beam type transducers, and more particularly, to an improved form of beam type transducer characterized in part by a suspension mechanism which maintains the beam in proper position on the support edge of an adjustable fulcrum, for pivotal movement thereabout with minimal hysteretic drag, while at the same time restraining the beam against all other movement and permitting the fulcrum to be adjusted laterally along the underside of the beam for varying the beam length on opposite sides of the support edge. 2. Description of the Prior Art The amplifier beam type transducer of the present invention is in many respects similar to the transducer disclosed in my prior U.S. Pat. No. 3,772, 490, granted Nov. 13, 1973. This patent, and the prior art that was cited and considered by the Patent Office and listed on the front page of such patent should be consulted for the purpose of background information and putting the instant invention into proper perspective.

A disadvantage of the transducer disclosed in my aforementioned U.S. Pat. No. 3,772,490 is that the actuator arm positioned on the support edge of the notched fulcrum is subject to hysteresis, causing drag, particularly when small changes in actuating pressures are exerted on the input end of the beam by the input load cell. This condition results, in part at least, from the arrangement of the beam within the transducer housing. The beam is free to move laterally with respect to the longitudinal axis of the housing and sometimes does until making contact with either the front or rear side wall of such housing. The drag resulting from such contact inhibits the free pivotal movement of the beam in response to an input load and sometimes causes, particularly at low input pressure changes, the output signal variations to slightly lag input pressure deviations.

Another disadvantage of the transducer disclosed by my aforementioned U.S. Pat. No. 3,772,490 is that the finite incremental stepped positioning of the fulcrum lengthwise in the housing provides a limited range of output variations. Movement of the notched fulcrum between adjacent notches on the fulcrum support changes the actuating ratio a specific amount, e.g. a 5 lb. per square inch interval in a pressure gauge installation. Another disadvantage of my previous transducer is that the side wall of the housing has to be removed to change the position of the fulcrum; hence, a few moments of time must be spent removing the screws holding the side wall against the housing.

Screw type mechanisms for adjusting the position of the fulcrum supporting the beam of an amplifier type transducer are broadly old, as illustrated, for example, by the following: U.S. Pat. No. 2,304,783, granted Dec. 15, 1942, to Robert R. Donaldson; U.S. Pat. No. 2,548,807, granted Apr. 10, 1951 to Miles Morgan et al; and U.S. Pat. No. 2,740,295, granted Apr. 3, 1956 to Eugene Perchonok.

SUMMARY OF THE INVENTION

Transducers according to the present invention are basically characterized by a beam which is supported for pivotal movement on an upper support edge of a fulcrum which is movable along the lower surface of the beam for changing the relative beam lengths on opposite sides of the fulcrum support edge. According to a particular aspect of the invention, the beam is maintaned in position on the support edge for the free pivotal movement thereabout, yet is restrained against all other movement by the simple yoke mechanism in cooperation with the beam housing.

According to another aspect of the invention, the beam of a transducer is positioned by a U-shaped yoke assembly having a first and second pivotal axis located near opposite ends of the transducer beams within the beam chamber. The U-shaped yoke has a pair of elongated side members disclosed on opposite sides of the beam and a transverse end member connected between the side members forming an open and closed end. The first pivotal axis includes inwardly opening blind holes formed on elongated sides of the housing which rotatably cooperate with laterally extending journals attached near the closed end of the U-shaped yoke assembly. The second pivotal axis includes a pair of pin journals extending outwardly from opposite sides of the beam and are rotatably mounted in a pair of aligned holes near an open end of the U-shaped yoke.

According to another feature of the invention, a fulcrum or an amplifier beam transducer includes an internally threaded laterally extending opening which is engaged by a threaded shaft to move the support edge of the fulcrum laterally varying the relative lengths of the beam on opposite sides of the support edge. An external thumb knob is provided for convenient movement of the fulcrum in the beam chamber.

According to another feature of the invention, an input load for an amplifier beam transducer can comprise either a single load cell threadably received in the transducer housing and positioned to contact one side of the transducer beam or a pair of load cells threadably received on opposite sides of the transducer housing and positioned to contact opposite sides of the input end of transducer beam. A movable wall is located within an internal cavity of each load cell and forms a fluid pressure chamber for responding to pressure variations of an external input pressure source. A push rod is positioned between the movable wall and the transducer beam so that variations in the relative fluid pressures connected to each pressure transducer will be reflected as a movement tending to pivot the beam about the fulcrum.

According to still another feature of the invention, an output load of an amplifier beam transducer comprises a control orifice in which the size of the orifice is varied in response to deviation of the input load. The control orifice is threadably received into an opening in the transducer housing and is positioned adjacent an end of the transducer beam. The control orifice includes a movable wall which is positioned in an internal cavity for movement relative to a closed end wall. A ring member is fixedly secured around an axially extending fluid inlet passageway through the closed end wall of the control orifice body. An outlet passageway is provided through the closed end wall at a point radially outwardly of the ring. A push rod is located between the movable wall and the transducer beam so that pivotal movement of the beam is reflected by axial displacement of the movable wall with respect to the ring member fixedly secured on the closed end of the control orifice body.

In view of the foregoing, it is an object of this invention to provide an amplifier beam transducer which is relatively free of hysteretic lag so that the output signal accurately reflects deviations in the input load.

It is another object of the invention to provide an amplifier beam transducer which has an infinite number of settings for the beam support fulcrum so that a desired output signal ratio may be selected corresponding to a particular input load deviation.

It is yet another object of the invention to provide a versatile housing for a beam amplifier transducer in which numerous types and numbers of input loads and output signal devices can be quickly and easily attached thereto for a multitude of different applications.

A further object of this invention is to provide a sensitive amplifier beam transducer which provides an instantaneous output signal in response to minute variations of input load.

It is yet a further object of this invention to provide a sensitive amplifier transducer for measuring the deviations of specific gravity of a liquid within a tank.

It is a further object of the invention to provide an amplifier beam transducer having component parts which are simple and inexpensive to manufacture and easy to assemble.

It is yet another object of the invention to provide an amplifier beam transducer having a housing with a removable side allowing access to the beam chamber for convenient assembly and repair.

It is yet another object of the invention to provide an amplifier beam transducer having an indicator positioned for external viewing illustrating the gain or amplification factor of the transducer by conveying the relative beam lengths on opposite sides of a supporting fulcrum.

These and other features, objects and advantages of the present invention will be apparent from the following detailed description, taken in conjunction with the accompanying drawings.

BRIEF DESCRIPTION OF THE DRAWINGS

FIG. 1 is a sectional front view, with some parts shown in elevation for clarity, of an amplifier beam transducer according to the instant invention;

FIG. 2 is a fragmented side elevation, partially cut away, of the amplifier beam transducer taken along line 2—2 of FIG. 1 illustrating a portion of the fulcrum adjusting means;

FIG. 3 is a fragmented cross-sectional view taken along line 3—3 of FIG. 1, some parts cut away, illustrating the beam positioning means at one end of the beam chamber and the fulcrum positioned indicating means;

FIG. 4 is a fragmented front elevation, with partial axial section, illustrating another embodiment of a load output means for the amplifier beam transducer of the present invention;

FIG. 5 is an exploded pictorial view illustrating the housing of the present invention, and the internal components;

FIG. 6 is a sectional end elevation taken along lines 6—6 of FIG. 1 illustrating the load output unit and the bias unit;

FIG. 7 is a sectional top planned view, with parts in elevation, taken along lines 7—7 of FIG. 1;

FIG. 8 is a front elevation of an amplifier beam transducer according to the present invention with coupling shown in phantom; and FIG. 9 is a front elevation, partially sectioned, of another embodiment illustrating the input load cells of the present invention attached to a liquid tank for measuring specific gravity variations.

DETAILED DESCRIPTION OF THE PREFERRED EMBODIMENT

Referring initially to FIGS. 1, 6 and 7, a beam amplifier transducer according to the instant invention is shown having a box-like housing 10 defining a beam chamber 12. A rigid beam 14 is positioned in beam chamber 12 and extends lengthwise toward opposite ends of housing 10. A prism-shaped fulcrum 16 is located within beam chamber 12 and includes a support edge 18 about which the beam pivots. A load input, illustrated in preferred form as comprising upper and lower separate units or cells 20 and 21, respectively, act on one end of beam 14 and the composite force pivots the beam about support edge 18 in response to variations in input pressure. At the opposite end of beam 14, a load output 22 is secured to housing 10 and responds to variations in the displacement of beam 14 caused by the load input creating an output signal which varies as a ratio of the load input.

As described herebefore, a particular problem with known prior art amplifier beam transducer is concerned with maintaining beam 14 on support edge 18 of fulcrum 16 so that beam 14 would be free to pivot on support edge 18 unrestrained by hysteretic losses. Referring now to FIG. 5 in conjunction with FIG. 1, a U-shaped yoke 24 is located in beam chamber 12 and maintains beam 14 on support edge 18 of fulcrum 16. The U-shaped yoke 24 basically comprises a pair of spaced apart side members 26 and 28 which are disposed on opposite sides of beam 14 and extend lengthwise in beam chamber 12. A transverse member 30 forms the closed end of U-shaped yoke 24 and connects side members 26 and 28 adjacent one end of beam 14. In preferred form, the first pivotal means comprises a pair of coaxial pivot pins 32 and 34 which are attached to side members 26 and 28, respectively, near the closed end of U-shaped yoke 24 and project laterally outwardly from opposite sides of beam 14. A pair of coaxial sockets 33 and 35 (FIG. 3) are formed on the side walls of housing 10 and are sized to rotatably receive pivot pins 32 and 34, respectively. Near the opposite end of beam chamber 12, a second pivotal means comprises a pair of coaxial pivot pins 36 and 38 and project laterally outwardly from opposite sides of beam 14. A pair of coaxial sockets 40 and 42 (FIG. 7) are formed in side members 26 and 28, respectively, and are sized to rotatably receive the outwardly extending pivot pins 36 and 38. (Retainers 41 and 43 are positioned on pivot pins 36 and 38, respectively, outwardly of openings 40 and 42 to confine the lateral movement of beam 14 with respect to U-shaped yoke 24.) Accordingly, the first pivotal axis, parallel to support edge 18 of fulcrum 16, is located near the closed end of U-shaped yoke 24 and the second pivotal axis, parallel to both the first pivotal axis and the support edge 18 of fulcrum 16, is located near the open end of U-shaped yoke 24 thereby allowing free pivotal movement of beam 14 with minimal hysteretic lag.

Referring now to FIGS. 1 through 5 through 8, housing 10 has previously been described as box-like and comprises spaced apart top and bottom walls 44 and 46, respectively, connected at opposite ends, by end walls 48 and 50. Rear wall 52 is moldingly attached to the upper lower and end walls forming an open sided box-like configuration defining beam chamber 12. Removable front side wall 54 is releasably secured to housing 10 by four corner screws allowing access to beam chamber 12 for insulation and maintenance of the internal components. A screw 56 extends through an opening 58 formed near each corner of front side wall 54 and is threadably received in an internally threaded opening 60 in each corner of housing 10.

As previously mentioned, load input cell 20 is mounted near one end of housing 10 and is adpated to contact beam 14. Near the opposite end, load output 22 is similarly mounted to housing 10 and is also responsive to pivotal movement of beam 14 within beam chamber 12. Accordingly, load input cell 20 is secured adjacent the input of beam 14 by a first mounting means which basically comprises a tubular socket 62 disposed to extend upwardly near one end of top wall 44 forming a first opening. In preferred form, tubular socket 62 is internally threaded to receive load input cell 20.

In the same manner, load output cell 22 is secured near the opposite end of housing 10 by a second mounting means. In preferred form, the second mounting means comprises tubular socket 63 which is secured to top wall 44 to extend upwardly adjacent the output end of beam 14 forming a second opening. Tubular socket 63 is internally threaded for receiving an externally threaded portion of load output cell 22.

The load input has been previously described, in preferred form, as comprising a pair of load input cells 20 and 21 which are positioned to contact opposite sides of beam 14. Accordingly, a third mounting means is disposed on housing 10 opposite the first mounting means and positions load input cell 21 to engage the input end of beam 14 coaxially with load input cell 20. Preferably, the third mounting means comprises a tubular socket 64 which is secured to bottom wall 46 to extend downwardly from the input end of housing 10 forming a third opening. Tubular socket 64 is coaxially aligned with tubular socket 62. Tubular socket 64 is also internally threaded for receiving a mating externally threaded portion load input cell 21.

It has previously been described that beam 14 pivots about support edge 18 of fulcrum 16 in response to forces exerted on an end. An adjustable bias cell 66, to be described in greater detail later, is also provided and is secured near the output end of housing 10 by a fourth mounting means. In preferred form, the fourth mounting means comprises a tubular output socket 65 disposed on bottom wall 46 extending coaxially downwardly opposite said opposite tubular socket 63 forming a fourth opening. Tubular socket 65 is internally threaded for receiving an externally threaded portion of bias unit 66.

Referring specifically to FIG. 5, an upper strengthening web 67 is moldingly secured to top wall 44 and is integrally connected at opposite ends to the side wall of the tubular sockets 62 and 63. A plurality of triangular gussets 68, in FIG. 5, are moldingly secured between opposite side walls of web 67 and top wall 44. In the same manner, a lower strengthening web 70 is moldingly secured to bottom wall 46 and at its opposite ends to the tubular sockets of the third and fourth mounting means. A plurality of triangular gussets 72 are moldingly secured between opposite side walls of strengthening web 70 and bottom wall 46.

Referring now to FIGS. 1 and 8, the load input means has been previously described as comprising a pair of load input cells 20 and 21 acting on opposite sides of beam 14 which act differentially to pivot beam 14 about support edge 18 of fulcrum 16. In preferred form, load input cells 20 and 21 are pressure transducers which convert the pressure of a gas or liquid at the measuring point (not shown) to a linear displacement force acting of frame 14. Load input cell 20 includes a cylindrical body 80 having an open and closed end and an axially extending internal cavity 82. A movable wall 84 is positioned in internal cavity 82 and is clamped at its periphery between collar 86 and end wall 88. Preferably, end wall 88 is externally threaded and is threadably received in an internally threaded open end of body 80 forming a fluid pressure chamber defined by end wall 88 and movable wall 84. An outwardly extending threaded shank 90 is attached to the outward portion of end wall 88 and is externally threaded for convenient attachment to the input fluid source to be measured (not depicted). An axially extending fluid passageway 92 is provided through end wall 88 allowing fluid to enter the pressure chamber. Load input cell 20 is releasably secured to the first mounting means on housing 10. An inwardly extending mounting base 98 is positioned on the closed end wall of cylindrical body 80 and is threadably received in the internally threaded tubular socket 62 of the first mounting means on housing 10. An O-ring 100 is positioned adjacent a recessed shoulder 102 in the inward portion of tubular socket 62 sealing against the end wall of mounting base 98. A passageway 102 is provided through mounting base 98 which communicates with the internal cavity 82 in load cell body 80. A rigid push rod 104 includes an enlarged head 106 at one end which contacts the inward side of movable wall 84 and, at its opposite end, the end portion of beam 14. In preferred form, the end of push rod 94 in contact with beam 14 is conically shaped. The mating portion of beam 14 includes an indention which is similarly shaped but sized slightly larger than the end of push rod 94 so that any binding tending to inhibit free pivotal movement of beam 14 is prevented.

Load input cell 21 is identical in construction aspects to load cell 21. As has been heretofore described, load cell 21 is positioned on housing 10 to contact beam 14 on the side opposite load cell 20. Accordingly, load cell 21 is threadably received in tubular socket 64 of the third mounting means.

Although in preferred form the load input has been described as a pair of load cells 20 and 21 acting on opposite side of one end of beam 14 so that the differential force pivots beam 14 about support edge 18 of fulcrum 60, it should be understood that a load input may comprise a single load cell acting only on one side of beam 14. In this event, only load cell 20 is utilized and forms a single force acting on the input end of beam 14.

Referring now to FIG. 1 in conjunction with FIG. 6, load output cell 22 has been previously described as being secured to the second mounting means of housing 10 adjacent the outward end of beam 14 so that variation in the input signal will cause corresponding variations in output signal. In preferred form, load output cell 22 is basically a control orifice which contacts the end of beam 44 so that linear movement of beam 14 varies the size of the control orifice. Load output cell 22 comprises an axially extending cylindrical body 110 with an open and closed end defining an internal cavity 112. An axially extending mounting base 114 is attached to the closed end wall of body 110 and is externally threaded for engaging the internally threaded tubular socket 63 of the second mounting means. A passageway 116 is provided through mounting base 114 which communicates with internal cavity 112. An O-ring 118 is positioned adjacent a recessed shoulder 120 of tubular socket 63 and is sealed against the end wall on mounting base 114. At the opposite end of cylindrical body 110, an end wall 121 is externally threaded and is threadably received in the open end of the cylindrical body. A movable wall 122 is positioned in internal cavity 112 and is clamped at its periphery between collar 124 and end wall 121. An inlet fluid passageway 126 which communicates with internal cavity 112 is provided through end wall 121. A coupling 129 is provided at the outward end of inlet fluid passageway 126. A control ring 128 is fixedly secured to the inward side of end wall 121 surrounding the inward opening of inlet fluid passageway 126. An outlet fluid passageway 130 is provided through end wall 121 radially outward of control ring 128. A coupling 131 is positioned at the outward end of outlet fluid passageway 130. A push rod 132 is positioned in passageway 116 through mounting base 114 and, at one end, an enlarged head contacts the inward side of movable wall 122 while, at its opposite end, push rod 132 contacts the output end portion of beam 14. As will be apparent, when beam 14 pivots about support edge 18 of fulcrum 16 in response to variations in the load input, push rod 132 will be linearly displaced. Accordingly, movable wall 122 will be in turn displaced with respect to control ring 128 causing a variation in the restriction or size of the orifice between inlet passageway 126 and outlet passageway 128. Therefore, an indication of the variations of the input load 20 can be monitored at a remote location by sensing pressure changes of a measuring fluid supplied to inlet passageway 129.

Again referring to FIGS. 1 and 6, it has been previously mentioned that the amplifier beam transducer of the instant invention also includes bias cell 66 which acts on the output end of beam 14. In preferred form, the bias cell 66 comprises an axially elongated cylindrical body 142 having an open and closed end including an internal cavity 143. An externally threaded mounting base 144 is secured to the closed end wall of body 142 and is threadably received in the tubular socket 65 of the fourth mounting means. An O-ring 146 is disposed at the inward portion of tubular mount 65 against shoulder and seals against the end wall of mounting base 144 and communicates with internal cavity 143. At the outward end of cylindrical body 142, an externally threaded end wall 150 is threadably received in the open end of body 142 and is seated against collar 152. A passageway 154 extends axially through end wall 150 communicating with internal cavity 143. A push rod 155 is positioned in passageway 148 of mounting base 144 and, at its inward end, contacts the output end portion of beam 14. At the outward end of push rod 155, a load member 156 is positioned to engage the end of push rod 155. A load adjusting screw 158 is disposed in passageway 154 and engages the outward end of load member 156. A wrench opening 159 is formed in the outward end of adjustment screw 158 allowing the loading of the spring member 156 to be varied by merely rotating the screw 158.

Referring now to FIGS. 1, 3 and 5 through 7, it has previously been described that the amplifier beam transducer of the present invention allows an output signal variation in accordance with a ratio of the input load. Variation in the ratio between load input and load output is varied by moving support edge 18 of fulcrum 16 in contact with the underside of beam 14 lengthwise in beam chamber 12. In preferred form, the fulcrum positioning means comprises a laterally extending internally threaded opening 160 in fulcrum 16. An elongated fulcrum adjusting screw 162 is positioned in beam chamber 12 parallel to the longitudinal axis of housing 10 and threadably engages internally threaded opening 160. A pin journal 164 is located on one end of fulcrum screw 162 and rotatably cooperates with an inwardly opening socket 166 on end wall 48 of housing 10. Near the opposite end, a disc-shaped journal 168 is fixedly secured to fulcrum adjusting screw 162. A U-shaped channel bearing 170 is provided on end wall 50 opening toward removable side wall 54. A retainer 172 projects from the inward side of removable wall 54 and contacts disc-shaped journal 168 in channel bearing 170 thereby positioning fulcrum adjusting screw 162 for rotation along an axis which is parallel to the side member of U-shaped yoke 24. A thumb knob 174 is attached to the outward end of fulcrum adjusting screw 162 for convenient rotation and, in turn, longitudinal positioning of fulcrum 16 in beam chamber 12.

Referring specifically to FIGS. 3 and 5, an externally viewable fulcrum indicating device is provided on removable side wall 54 so that the amplifier gain or ratio of the input to the output load can be generally observed. In preferred form, fulcrum indicating means comprises a magnet 180 which is positioned in an opening 181 on the end face of fulcrum 16 adjacent to removable side 54. A length of transparent plastic tubing 182 is secured to the outer face of removable side wall 54 along an axis which is substantially parallel to the longitudinal axis of housing 10. A steel ball is positioned within the passageway of tubing 182 and is sized sligthly less than the tubing internal diameter for free movement therein. Accordingly, as the fulcrum is moved along the longitudinal axis in beam chamber 12 under the control of fulcrum adjusting screw 162, magnet 182 influences steel ball 184 causing it to follow the longitudinal positioning of fulcrum 16.

Referring now to FIG. 4, an alternative embodiment of load output cell 22 will not be described. As has been previously mentioned, load output cell 22 contacts the output end of beam 14 and provides an output signal in response to variations in input load. In alternative form, load output 22 comprises a linear displacement 190 in which variations in input load can be read directly as linear movement on the face of a guage. Preferably, a displacement gauge 190 comprises an axially elongated circular body 192 having an open and closed end defining an internal cavity 194 therein. An externally threaded mounting base 196 is attached to the closed end wall of body 192 and is threadably received in the tubular socket 63 of the second mounting means on housing 10. An O-ring (not shown) is positioned adjacent recessed shoulder 120 in the inward portion of tubular socket 63 and seals against the end wall of mounting base 196. An axially elongated passageway 200 is formed in mounting base 196 and communicates with internal cavity 194. At the opposite end of cylindrical body 192, an end wall 201 is externally threaded and is threadably received in the internally threaded open end of cylindrical body 192. Movable wall 202 is positioned in internal cavity 194 and is clamped at its periphery between the inward end face of end wall 201 and collar 204 forming a sealed pressure chamber 205. An axially elongated externally threaded mounting shank 206 is formed to protrude outwardly from end wall 201. An axially extending passageway 208 is formed in threaded mounting shank 206 which communicates with internal cavity 194 outwardly of movable wall 202. A transparent tube 210 having an opened and closed end is positioned in passageway 208 so that its open end communicates with pressure chamber 205. A flange 212 is secured to transparent tube 210 near its open end. An O-ring 214 is positioned on transparent tube 210 inwardly of flange 212 and contacts the end wall of mounting shank 206. An internally threaded cap 216 is threadably received on mounting shank 206 and includes an end wall which abuts the outward side wall of flange 212 sealing pressure chamber 205. If desired, a face 218 having linear indicia thereon may be placed adjacent transparent tube 210 for reading variations in the fluid level within transparent tube 210. A push rod 220 is positioned in passageway 200 of mounting base 196 and includes an enlarged head 222 at one end which contacts the inward side of movable wall 202. At the opposite end, push rod 220 contacts the output end of beam 14. As is apparent, the linear movement of push rod 220 contacts the output end of beam 14. As is apparent, the linear movement of push rod 220 caused by the pivotal movement of beam 14 about support edge 18 displaces movable wall 202 changing the volumetric size of pressure chamber 205. This variation, in turn, causes a deviation in the liquid level of the fluid in transparent tube 210 which can be directly measured on face 218.

The combined adaptability and features of the hereabove described amplifier beam type transducer are particularly apparent when used in the monitoring of commerical manufacturing processes wherein it is desirable to monitor the specific gravity of a liquid in a tank.

Referring now to FIG. 9, the amplifier beam transducer of the present invention is shown attached to the side of a tank containing a liquid having a changing specific gravity. Identical threaded nipples 224 and 225 are threadably received in tubular socket 62 and 64, respectively, of the first and third mounting means on housing 10. Tubular extenders 226 and 227 are secured to respective threaded nipples and project in opposite directions along the vertical side wall of the tank. Load input cells 20 and 21 are positioned near the outward end of each tubular extension 226. The respective inlet fluid passageway of each load cell communicate with the liquid in the tank at vertically displaced points. As will be appreciated by those of ordinary skill in the art, variations in the specific gravity of the liquid in the tank will be reflected by a differential pressure variation between load input cell 20 and 21. Hence, this pressure variation will cause pivotal movement of beam 14 about support edge 18 of fulcrum 16 which can be monitored by the heretofore described load output cell 22. Additionally, assume it is known that the fluid pressure varies between 1 and 3 psi thereby corresponding to a differential pressure of 2 psi. Fulcrum 16 can be positioned longitudinally in beam chamber 12 so that a 2 psi differential pressure causes a full scale deflection of load output 22. This allows minute variations in specific gravity to be monitored at either a remote location or observed directly on the side of the tank.

It should also be understood that numerous other types of load input cells could be used in conjunction with the beam type amplifier transducer according to the instant invention. For example, if an extremely high pressure is being monitored, the size of the fluid pressure chamber could be reduced and the component parts fabricated from a stronger material such as metal or the like. Accordingly, variation in the sensed pressure would cause pivotal movement of beam 14 about support edge 18 of fulcrum 16 in the same manner as hereabove described.

In preferred form housing 10 is fabricated as a single molded unit from a plastic material such as nylon 612 or a similar material. In the same manner, beam 14 and the bodies of the load cells are similarly fabricated from the same material.

The above embodiments are to be considered in all respects as merely illustrative and not restrictive. The scope of the invention is to be determined by the appended claims rather than the foregoing description. It is intended that all changes in construction which come within the meaning and range of equivalency of the claims are to be embraced therein.

What is claimed is:

1. A transducer, comprising:
   housing means forming a beam chamber;
   an elongated rigid beam within said chamber;
   a fulcrum positioned within said chamber providing a support edge in contact with said beam about which said beam pivots;
   adjusting means for moving the fulcrum in said chamber lengthwise along said beam, to in that manner vary the relative lengths of the beam portions on opposite sides of the support edge;
   means within said housing for both maintaining said beam on said support edge, for pivotal movement therabout, and for restraining said beam against all other movement, comprising:
      a U-shaped yoke including a pair of elongated side members disposed on opposite sides of the beam and a transverse end member interconnected between corresponding ends of said side members, so that the yoke has both a closed end and an open end;
      first pivot means near one end of the yoke, connecting said yoke to said housing for pivotal movement about a first axis which is parallel to the support edge of the fulcrum; and
      second pivot means near the opposite end of the yoke, connecting said yoke to said beam for pivotal movement about a second axis which is parallel to both the first axis and the support edge of the fulcrum;
   load input means for exerting a force on one end portion of the beam in a direction tending to pivot the beam about the support edge of said fulcrum; and
   load output means responsive to displacement of the opposite end portion of said beam, upon such pivotal movement of said beam, to produce an output signal responsive to the input force.

2. A transducer according to claim 1, wherein said housing comprises spaced apart top and bottom walls, spaced apart end walls and spaced apart side walls, together defining said beam chamber, and wherein said first pivot means comprises a pair of coaxial pivot pins and a pair of coaxial sockets in which said pivot pins are rotatably received, wherein one of said pivot pins and its socket are located on one side of the beam and the other pivot pin and its socket are located on the opposite side of said beam, and wherein on each side of the beam one of the pin and socket is carried by the beam and the other is carried by the side wall of the housing.

3. A transducer according to claim 2, wherein one side wall of said housing is completely removable from the housing, to define a side opening enabling said removable side wall to be moved laterally away from the housing to in that manner remove the near pivot pin from its socket, and then the beam and yoke to be moved laterally out from said beam chamber, through said side opening, to in that manner remove the opposite pivot pin from its socket.

4. A transducer according to claim 3, wherein the fulcrum and the adjusting means for said fulcrum are also movable laterally out from the beam chamber through said side opening when the removable side of said housing is removed.

5. A transducer according to claim 4, wherein said fulcrum is formed to include an internally threaded passageway extending laterally therethrough, perpendicular to said support edge, and wherein the adjusting means for positioning the fulcrum lengthwise in said chamber comprises an elongated adjustment screw having a threaded portion engaging said threaded passageway and a rotatable control portion at one end thereof, and means at the opposite end of said housing mounting said adjustment screw within said beam chamber for rotation about its axis with said control portion positioned outside of said beam chamber.

6. A transducer according to claim 5, wherein the mounting means for the adjustment screw includes means on said adjustment screw, between said threaded portion and said control portion, and means carried by a first end wall of said housing together, cooperating to restrain said adjustment screw against all movement except rotation, and pin and socket means at the opposite end of said adjustment screw, rotatably mounting said opposite end onto the opposite end wall of the housing.

7. A transducer according to claim 2, wherein the coaxial sockets are formed in the side walls of the housing and the coaxial pivot pins are carried by the yoke.

8. A transducer according to claim 7, wherein the coaxial pivot pins are located on the yoke adjacent the closed end thereof, and wherein the second pivot means comprises a pair of coaxial pivot pins projecting outwardly from opposite sides of said beam, and openings formed in end portions of the side members at the open end of the yoke, through which such pivot pins project.

9. A transducer according to claim 1, wherein said housing comprises spaced apart top and bottom walls, spaced apart end walls and spaced apart side walls, together defining said beam chamber, said housing including means defining a first opening in one of said top and bottom walls, opening towards a first end of said beam, and first mounting means surrounding said opening, wherein said load input means comprises a load input member extending through said first opening and contacting said beam member, and support means therefor connected to said first mounting means, and a second opening in one of said top and bottom walls, opening towards the opposite end of said beam, and second mounting means surrounding said second opening, and wherein said load output means includes support means connected to said second mounting means.

10. A transducer according to claim 9, wherein said first opening is formed in the top wall of the housing, wherein a third opening is formed in the bottom wall of the housing, generally opposite the first opening, and third mounting means surrounding the third opening, wherein said load input means further includes a second load input member extending inwardly through the third opening and contacting the first end of the beam, generally opposite the first load input member, and support means therefor connected to said third mounting means, with the differential force produced by the two load input members serving to pivot the beam about the support edge of the fulcrum.

11. A transducer according to claim 9, wherein each said mounting means comprises an internally threaded socket and each said support means comprises an externally threaded base.

12. A transducer according to claim 11, wherein the threaded sockets are identical and the threaded bases are identical, so that the load input means and the load output means are interchangeable, mountable on said housing relative to said beam.

13. A transducer according to calim 1, wherein said housing comprises spaced apart top and bottom walls, spaced apart end walls, spaced apart side walls, together defining said beam chamber, wherein one of said walls carries an elongated tubular member constructed from a light transmitting material, extending lengthwise of the path of movement of said fulcrum in said beam chamber, wherein said fulcrum carries a first element, wherein a second element is located inside of said tubular housing, and movable axially therein, and wherein one of said elements is a magnet and the other is a material which is attractive to a magnet so that said second element within the tubular housing will follow the first element carried by the fulcrum, to in that manner indicate the position of the fulcrum.

14. Transducer apparatus of a type which receives an input signal at one end of a beam that is mounted for pivotal movement about a fulcrum positioned between the two ends of the beam and which transmits an output signal at the other end of the beam, comprising:
housing means forming a beam chamber;
an elongated rigid beam within said chamber having an input end and an output end;
a fulcrum positioned within said chamber, providing a support edge in contact with said beam about which said beam pivots;
adjusting means for moving the fulcrum in said chamber lengthwise along said beam, to in that manner vary the relative lengths of the beam portions on opposite sides of the support edge; and
means within said housing both maintaining said beam on said support edge, for pivotal movement thereabout, and restraining said beam against all other movement, comprising:
a U-shaped yoke including a pair of elongated side members disposed at opposite sides of the beam and a transverse end member interconnected between corresponding ends of said members, so that the yoke has both a closed end and an open end;
first pivot means near one end of the yoke, connecting said yoke with said housing for pivotal movement about a first axis which is parallel with the support edge of the fulcrum;
second pivot means near the opposite end of the yoke, connecting said yoke to said beam for pivotal movement about a second axis which is parallel to both the first axis and the support edge of the fulcrum.

15. A transducer according to claim 14, wherein said housing comprises spaced apart top and bottom walls, spaced apart end walls and spaced apart side walls, together defining said beam chamber, and wherein said first pivot means comprises a pair of coaxial pivot pins and a pair of coaxial sockets in which said pivot pins are rotatably received, wherein one of said pivot pins and its socket are located on one side of the beam and the other pivot pin and its socket are located on the opposite side of said beam, and wherein on each side of the beam one of the pin and socket is carried by the beam and the other is carried by the side wall of the housing.

16. A transducer according to claim 15, wherein the coaxial sockets are formed in the side walls of the housing and the coaxial pivot pins are carried by the yoke.

17. A transducer according to claim 16, wherein the coaxial pivot pins are located on the yoke adjacent the closed end thereof, and wherein the second pivot means comprises a pair of coaxial pivot pins projecting outwardly from opposite sides of said beam, openings formed in end portions of the side members at the open end of the yoke, through which such pivot pins project.

18. A transducer according to claim 15, wherein one side wall of said housing is completely removable from the housing, to define a side opening, enabling said removable side wall to be moved laterally away from said housing to in that manner remove the near pivot pin from its socket, and then the beam and yoke to be moved laterally out from said beam chamber, through said side opening, to in that manner remove the opposite pivot pin from its socket.

19. A transducer according to claim 18, wherein the fulcrum and the adjusting means for said fulcrum are also movable laterally out from the beam chamber through said side opening when the removable side of said housing is removed.

20. A transducer according to claim 14, wherein said fulcrum is formed to include an internally threaded passageway extending laterally therethrough, perpendicular to said support edge, and wherein the adjusting means for positioning the fulcrum lengthwise in said chamber comprises an elongated adjustment screw having a threaded portion engaging said threaded passageway and a rotatable control portion at one end thereof, and means at opposite ends of said housing mounting said adjustment screw within said beam chamber for rotation about its axis with said control portion positioned outside of said beam chamber.

21. A transducer according to claim 14, wherein said housing comprises spaced apart top and bottom walls, spaced apart end walls and spaced apart side walls, together defining said beam chamber, said housing also including means defining a first opening in one of said top and bottom walls, opening towards a first end of said beam, and first mounting means surrounding said opening for receiving one of a load input means and a load output means having identical mounting base portions, and a second opening in one of said top and bottom walls, opening towards the opposite end of said beam, and second mounting means surrounding said second opening, for receiving the other of the load input means and load output means.

22. Transducer apparatus of a type which receives an input signal at one end of a beam that is mounted for pivotal movement about a fulcrum positioned between the two ends of the beam and which transmits an output signal at the opposite end of the beam, comprising:
  housing means forming a beam chamber;
  an elongated rigid beam within said chamber having an input end and an output end;
  a fulcrum positioned within said chamber about which said beam pivots;
  said housing comprising spaced apart top and bottom walls, spaced apart end walls and spaced apart side walls, together defining said beam chamber, said housing also inlcuding means defining a first opening in the top wall, opening towards the input end of said beam, and first mounting means surrounding said opening for receiving a load input means, means defining a second opening in said top wall, opening towards the output end of said beam, and second mounting means surrounding said second opening, for receiving a load output means, means defining a third opening in the bottom wall of the housing, generally opposite the first opening, and third mounting means surrounding the third opening for receiving a load input means which coacts with input means positioned in said first mounting means to produce a differential force tending to pivot beam about the support edge of the fulcrum; and means defining a fourth opening in the bottom wall of said housing, generally opposite said second opening, and fourth mounting means surrounding the fourth opening, for receiving a bias means adpated to contact the output end of said beam and to provide an adjustable force acting upon the output end of said beam;
  each said mounting means comprising an internally threaded tubular socket, said sockets upstanding from and integrally connected to the top and bottom walls; and
  a first strengthening web extending between the tubular sockets upstanding from the top wall, and a second strengthening web extending between the tubular sockets upstanding from the bottom wall, said webs being integrally connected to the sockets at their ends and being integrally connected to the top and bottom walls respectively of the housing along their inboard extents.

23. A transducer according to claim 22, further comprising at least one triangular gusset on each side of said first web, extending between the first web and the top wall of the housing; and at least one triangular gusset on each side of said second web, extending between the side wall of the second web and the bottom wall of the housing.

* * * * *